United States Patent [19]

Leclerco et al.

[11] 3,713,608
[45] Jan. 30, 1973

[54] RETRACTABLE LANDING GEAR

[75] Inventors: Jacques Leclerco, Saint-leu-la-Foret; Louis Reide, 92 Meudon, both of France

[73] Assignee: Societe Hispano-Suiza Lallemant, Bois-Colombes, France

[22] Filed: Jan. 20, 1971

[21] Appl. No.: 108,074

[30] Foreign Application Priority Data

Jan. 28, 1970 France..................................7003047

[52] U.S. Cl. ............................................244/102 R
[51] Int. Cl. .............................................B64c 25/10
[58] Field of Search ..............244/102, 100 R, 103 R

[56] References Cited

UNITED STATES PATENTS

| | | | |
|---|---|---|---|
| 2,772,060 | 11/1956 | Bendicsen | 244/102 R |
| 3,533,580 | 10/1970 | Lucien | 244/102 R |

*Primary Examiner*—Trygve M. Blix
*Assistant Examiner*—Paul E. Sauberer
*Attorney*—Larson, Taylor & Hinds

[57] ABSTRACT

The landing gear comprises a retractable strut and at least one movable element borne by the strut and is capable of undergoing a movement of retraction which brings it close to the lifting axle of the strut in the course of retracting the said strut. A compensating mechanism is interposed between a zone of the main linkage and the auxiliary brace. The landing gear is suitable for aircraft of a certain weight.

6 Claims, 3 Drawing Figures

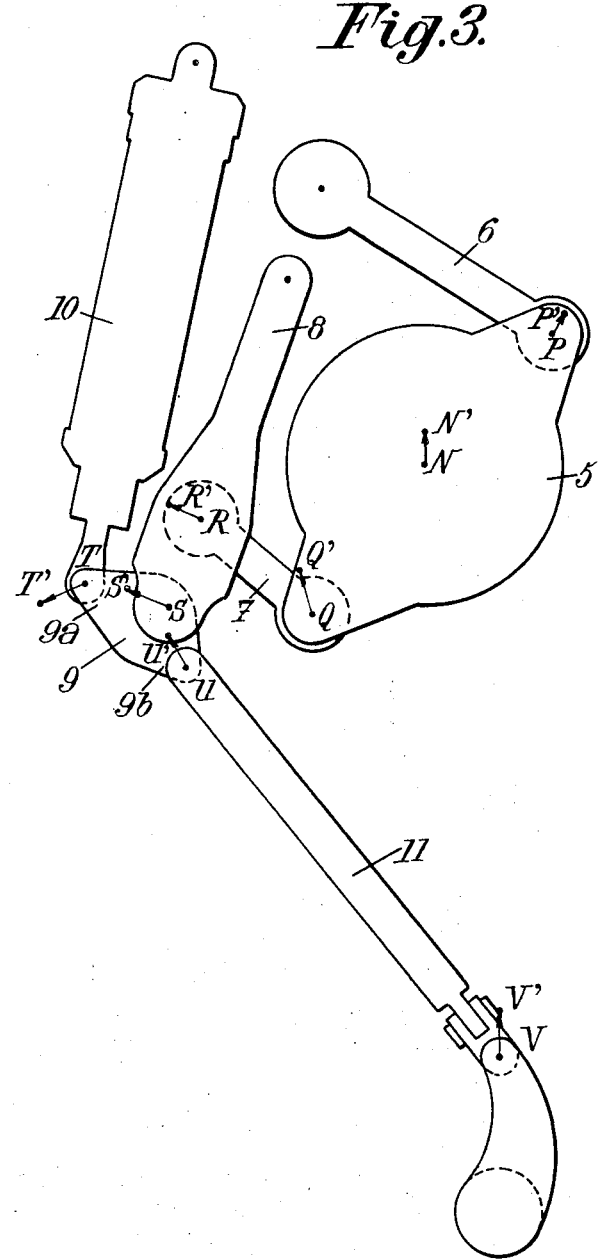

RETRACTABLE LANDING GEAR

The invention relates to landing gear comprising a liftable strut and at least one movable element borne by the said strut and capable of undergoing relative movement with respect to the strut in the course of its lifting.

This movable element may be constituted by the rolling assembly, which then undergoes retraction (or shortening) or a change in orientation (or pivoting movement) on the lifting of the strut in order to be housed more easily in a reduced space.

This landing gear is connected to the aircraft by, on one hand, a principal brace comprising a cross-piece connected to the strut and defining a lifting axis for the said strut, said cross-piece being capable of undergoing temporary strains under the effect of forces exerted on the gear, and, on the other hand, an auxiliary linkage comprising the end of a mechanical linkage ensuring the actuating of the movable element on lifting of the strut.

Hitherto, the auxiliary linkage was simply constituted by a fixed structure of the aircraft, on which was supported the end of the mechanical linkage for the control of the movable element, and it was then noted, on temporary strains of the cross-piece of the principal brace, that considerable forces were also transmitted through this mechanical linkage, which forces had to be taken up by the fixed structure of the aircraft.

There was then a risk, either of breakage of the auxiliary linkage at the level of the fixed structure, or a breakage or a deterioration in the mechanical linkage for actuating the movable element.

It is an object of the present invention to provide a landing gear which is free of the drawbacks described above.

It is a further object of the invention to provide a landing gear in which the temporary strains of the cross-piece of the principal brace causing temporary strains of the auxiliary linkage, are compensated.

The landing gear according to the invention comprises a liftable strut and at least one movable element borne by the said strut and capable of undergoing relative movement with respect to the said strut in the course of its lifting, said landing gear being connected to the aircraft by, on one hand, a principal brace comprising a cross-piece connected to the strut and defining a lifting axis for the said strut, said cross-piece being capable of undergoing temporary strains under the effect of forces exerted on the gear, and, on the other hand, an auxiliary linkage comprising the end of a mechanical linkage ensuring the actuating of the movable element, said gear being characterized by the fact that a compensating mechanism, supported on a fixed structure of the aircraft, is interposed between a zone of the principal brace which undergoes predictable temporary strains and the auxiliary linkage, said compensating mechanism having a transmission ratio between the principal linkage and the auxiliary brace such that it transmits to the auxiliary linkage temporary strains of which the amplitude is equal at least approximately, to the amplitude of the temporary strains undergone by the strut of the landing gear.

The invention consists, apart from this main feature, of certain other features which are preferably used at the same time and which will be more explicitly considered below.

In order that the invention may be more fully understood a preferred embodiment of a landing gear according to the invention is described below purely by way of illustrative but non-limiting example, with reference to the accompanying drawings, in which.

Figure 2:
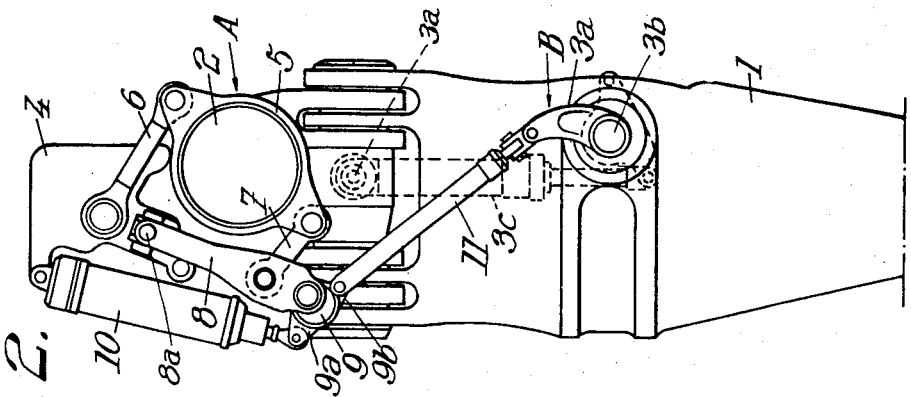
FIG 2 shows, viewed in the direction parallel to the lifting axis of its strut, the embodiment shown in FIG. 1; and, FIG. 3, lastly, is a view on a larger scale, and along the direction parallel to the axis of its strut, of the main elements of the landing gear shown in FIGS. 1 and 2.
Figure 1:
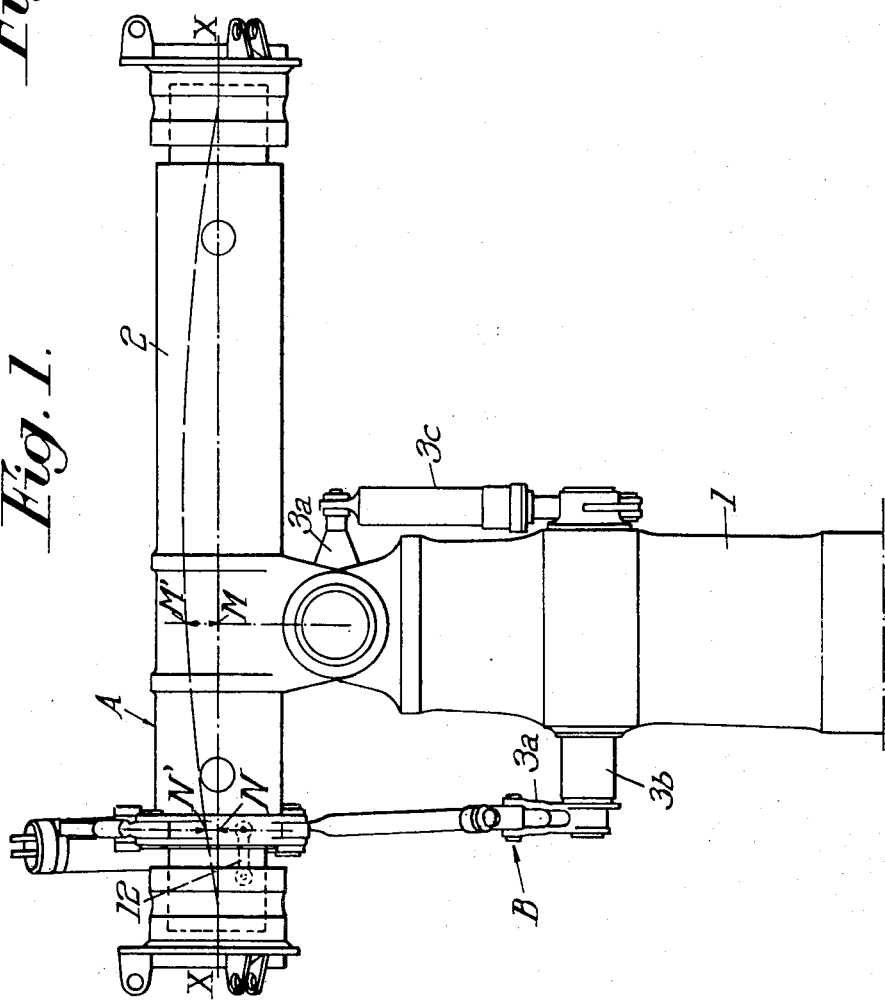
FIG. 1, shows viewed in a direction perpendicular to the lifting axis of its strut, one embodiment of a landing gear according to the invention.

As shown in FIGS. 1 and 2, this landing gear comprises a liftable strut 1 and at least one movable element (not shown but it may be supposed as being constituted by the wheel assembly) borne by the said strut 1 and capable of undergoing a movement of retraction which closes the said movable element of the lifting axis XX around the strut 1 in the course of lifting the said strut 1.

This landing gear is connected to the aircraft by, on one hand, a principal brace A comprising a cross-piece 2 connected to the strut 1 and coaxial with the lifting axis XX for the said strut 1, this cross-piece 2 being capable of undergoing temporary strains under the effect of forces exerted on the gear, and, on the other hand, an auxiliary linkage B comprising the end of a mechanical linkage for retracting the movable element on lifting of the strut 1, this mechanical linkage being constituted by a group of parts denoted generally by the reference numeral 3.

This being the case and according to the invention, a strain compensating mechanism supported on a fixed structure 4 of the aircraft, which fixed structure is constituted by a rigid mounting, is interposed between a zone of the principal brace A which undergoes predictable temporary strains and the auxiliary linkage B, this compensating mechanism having a transmission ratio between the principal linkage A and the auxiliary linkage B such that it transmits to the auxiliary linkage B temporary strains of which the amplitude is equal, at least approximately, to the amplitude of the temporary strains undergone by the strut of the landing gear.

In the embodiment of the invention illustrated in FIGS. 1 and 2, the compensating mechanism is interposed between the cross-piece 2 and the end of the mechanical linkage 3 which comprises a lever 3a hinged around an axle 3b borne by the strut 1 and parallel to the lifting axis XX, a jack 3c and pivot 3d.

According to the axial arrangement of the compensating mechanism along the cross-piece 2, the transmission ratio of strains between the cross-piece 2 distal end of the mechanical linkage is greater than one (amplification of strains), equal to unity (simple transmission of strains) or less than unity (reduction of strains).

For constructional reasons, the compensating mechanism is generally laterally displaced with respect to the strut 1 and is arranged, as shown in FIG. 1, close to a pivot of the cross-piece 2. Under these conditions, the transmission ratio of the compensating mechanism is greater than one.

In fact, the amplitude of the strain in the strut 1 is represented by the lines M M' corresponding to the flexure of the cross-piece 2 at the level of the strut 1, whilst the amplitude of the strain in the cross-piece 2 in line with the compensating mechanism is represented by the segment N N' which is less than M M'. Since the compensating mechanism must transmit to the auxiliary linkage B ( mechanical linkage 3a ) strains of which the amplitude V V' ( FIG. 3 )is equal to the amplitude of the strains undergone by the strut 1, this compensating mechanism must hence have a transmission ratio greater than unity.

As for the compensating mechanism proper, it comprises advantageously, as shown in FIGS. 1 and 2, a compensating lever 5 mounted pivotally at its middle point on the cross-piece 2, an upper compensating tie-rod 6 articulated in one of the ends of the compensating lever 5 and on the fixed structure 4 of the aircraft, a lower compensating tie-rod 7 articulated on the other end of the compensating lever 5 and on an equalizing lever 8 of which one end is connected through a Cardan joint 8a to the fixed structure 4 of the aircraft, a bent lever 9 of which the middle point is hinged on the free end of the equalizing lever 8, this bent lever 9 having a large arm 9a and a small arm 9b, and a sprung and double-acting elastic tie-rod 10, hinged on the large arm 9a of the bent lever 9 and on the fixed structure 4 of the aircraft.

A connecting rod 11 connects the small arm 9b of the bent lever 9 to the end of the mechanical linkage 3 for by retracting the movable element.

The equalizing lever 8 being connected to the fixed structure 4 of the aircraft through a Cardan joint 8a, its position in the vertical plane is ensured by a wind-bracing rod 12 connecting the said equalizing lever 8 to the cross-piece 2.

The operation of such a compensating mechanism is then as follows ( FIG. 3 ).

On strain occuring in the cross-piece 2 of an amplitude N N' to the right of the compensating mechanism, the compensating lever 5 follows the movement of this cross-piece 2 and it pivots around the upper point of attachment O of the upper compensating tie-rod 6, the point of attachment P coming to P'.

The point of attachment Q of the lower compensating tie-rod 7 then comes to Q', the displacement QQ' being greater than the amplitude N N' of the strain of the cross-piece 2, and this in a manner proportional to the ratio of the two arms of the compensating lever 5 : this is the first part of the amplification due to the compensating mechanism.

The displacement Q Q' is retransmitted to the equalizing beam 8 through the lower compensating rod 7 of which the end hinged on the said equalizing beam 8 is displaced from R to R'.

The free end of the equalizing beam is displaced from S to S ', the displacement S S' being greater than the displacement R R', and this in a manner proportional to the ratio of the two arms of the equalizing beam 8 : this is the second part of the amplification due to the compensating mechanism.

The end of the large arm 9a of the lower lever 9 is displaced from T to T' and the end of the small arm 9b of the lower lever is displaced from U to U'.

The two ends U V of the connecting rod 11 then come to U' V' , the amplitude V V' being equal to the amplitude N N'.

According to the direction of the forces which are exerted on the landing gear, the amplitude of the strain of the main brace A ( cross-piece 2 ) varies, and the amplitude of strain of the auxiliary linkage B ( mechanical linkage 3 ) varies equally. Under these conditions, the ratio of transmission of the compensating mechanism is not always adequately adjusted. It is to compensate these small differences that the elastic link-rod 10 is interposed between the large arm 9a of the bent lever 9 and the fixed structure 4 of the aircraft.

The end 5 of the equalizing beam 8 and the end U of the connecting rod will have a relative movement with respect to one another, which relative movement is due to the fact that the ratio of transmission of the compensating mechanism is not perfect, taking into account the amplitude of the strain of the landing gear.

The end U will pivot around the end S, the large arm 9a of the bent lever 9 will be actuated and stretch or compress the elastic link-rod 10 which thus absorbs the strains which are not perfectly compensated by the compensating mechanism.

As a result, there is provided a landing gear in which the risks of breakage of the auxiliary linkage, or of breakage or of deterioration of the actuating mechanical linkage of the movable element , are practically eliminated .

In addition, the compensating mechanism provided by the preferred embodiment of the invention is particularly compact and only includes elements which surround the cross-piece ; it is hence possible to house such a compensating mechanism in practically all cases.

As is self-evident and as also emerges besides from the preceding description, the invention is in no way limited to those embodiments application, nor to those of its types of of its various parts, which have been more particularly indicated : it embraces, on the contrary, all modifications.

We claim

1. In an aircraft undercarriage a liftable landing gear comprising a strut and at least one wheel assembly borne by said strut and adapted to undergo relative movement with respect to the strut in the course of its lifting, said landing gear being connected to the aircraft by:

a principal brace comprising a cross-piece supported by at least two pivots, said cross-piece being connected to the strut and defining a lifting axis for said strut, and an auxiliary linkage comprising a mechanical linkage arranged to effect said relative movement of the wheel assembly in the course of its lifting, said landing gear including a strain-compensating mechanism comprising the elements:

a compensating lever mounted pivotably at is middle point on the cross-piece, an equalizing lever mounted pivotably on a fixed structure of the aircraft, an upper tie-rod articulated on the fixed structure of the aircraft and on one of the ends of the compensating lever, a lower tie-rod articulated on the equalizing lever and on the other end of the compensating lever, and an elastic tie-rod mounted between the fixed structure of the aircraft and one of said compensating lever, equalizing lever, upper tie-rod or lower tie-rod, the end of said mechanical linkage being attached to one of said compensating lever, equalizing lever, upper tie-rod or lower tie-rod, the strains occurring in said principal brace and transmitted to the auxiliary linkage being compensated as a result of the relative size and position of said elements.

2. Landing gear according to claim 1, wherein the elastic tie-rod is mounted between the fixed structure of the aircraft and one of the ends of a bent lever of which the middle point is hinged on the free end of the equalizing lever, the other end of this bent lever being connected to one end of a connecting rod, the other end of which is connected to said end of the mechanical linkage.

3. Landing gear according to claim 2, wherein the bent lever has a large arm and a small arm.

4. Landing gear according to claim 1 wherein the equalizing lever is mounted on the fixed structure of the aircraft through a Cardan joint.

5. Landing gear according to claim 1 wherein one of said compensating lever, equalizing lever, upper tie-rod and lower tie-rod is connected to the cross-piece by a wind bracing tie-rod.

6. Landing gear according to claim 5, wherein the wind bracing tie-rod is mounted between the cross-piece and the equalizing lever.

* * * * *